(12) United States Patent
Yang

(10) Patent No.: US 9,021,897 B2
(45) Date of Patent: May 5, 2015

(54) VERSATILE, FLEXIBLE, AND ROBUST MEMS/NEMS SENSOR FOR DECOUPLED MEASURING OF THREE-DIMENSIONAL FORCES IN AIR OR LIQUIDS

(76) Inventor: Shengyuan Yang, West Melbourne, FL (US)

( * ) Notice: Subject to any disclaimer, the term of this patent is extended or adjusted under 35 U.S.C. 154(b) by 342 days.

(21) Appl. No.: 13/598,661

(22) Filed: Aug. 30, 2012

(65) Prior Publication Data

US 2014/0060207 A1    Mar. 6, 2014

(51) Int. Cl.
*G01L 5/10*    (2006.01)
*G01L 1/00*    (2006.01)

(52) U.S. Cl.
CPC ........................................ *G01L 1/00* (2013.01)

(58) Field of Classification Search
None
See application file for complete search history.

(56) References Cited

U.S. PATENT DOCUMENTS

| 4,951,510 A | * | 8/1990 | Holm-Kennedy et al. .................. 73/862.041 |
| 5,839,202 A | * | 11/1998 | Tezuka et al. ................... 33/503 |
| 7,966,898 B2 | | 6/2011 | Roukes |

OTHER PUBLICATIONS

Micromachined Force Sensors for the Study of Cell Mechanics; by Yang and Saif; American Institute of Physics; Review of Scientific Instruments 76, 044301 (2005); doi 10.1063/1.1863792.

* cited by examiner

*Primary Examiner* — Lisa Caputo
*Assistant Examiner* — Brandi N Hopkins
(74) *Attorney, Agent, or Firm* — John L. DeAngelis; Beusse Wolter Sanks & Maire, p.A

(57) ABSTRACT

A force measuring device. The device comprises an x-axis sensor beam for measuring x-direction forces, a y-axis sensor beam for measuring y-direction forces, a z-axis sensor beam for measuring z-direction forces, and wherein the x-axis, y-axis and z-axis sensor beams are decoupled such that forces exerted by a specimen in one direction do not exert substantial forces on the other two sensor beams.

16 Claims, 1 Drawing Sheet

VERSATILE, FLEXIBLE, AND ROBUST MEMS/NEMS SENSOR FOR DECOUPLED MEASURING OF THREE-DIMENSIONAL FORCES IN AIR OR LIQUIDS

FIELD OF THE INVENTION

The present invention relates to micro and nano electromechanical systems (MEMS/NEMS) force sensors and in particular such sensors for measuring decoupled forces in three dimensions.

BACKGROUND OF THE INVENTION

The need to measure small distances (on the order of fractions of a nanometer) and small forces (on the order of piconewtons) has motivated developments in the field of atomic force microscopy (AFM), which is also referred to as scanning force microscopy (SFM).

AFM devices are important tools in nano-science especially in cellular studies. A conventional AFM device comprises a cantilever with a sharp tip (probe) that is scanned over a cell surface, for example. When the tip contacts the cell surface, forces developed between the tip and the cell cause deflection of the cantilever. AFM devices measure mechanical contact forces, van der Waals forces, capillary forces, chemical bonding forces, electrostatic forces and magnetic forces. Typically, the amount of deflection is measured using a laser spot reflected from a top surface of the cantilever onto an array of photodiodes.

Disadvantageously, a cantilever-based AFM device can measure forces in only one or two dimensions and further requires sophisticated tools to detect these nanometer-scale cantilever deflections. Existing readouts for AFM scanned probe microscopy cantilevers are predominantly based on external (off-chip) displacement sensing systems that typically greatly exceed the size scale of the cantilever sensors themselves.

The sensor design of the present invention was motivated by a need in cell mechanics studies to measure micro-scale and nano-scale forces and cell responses to applied forces in air and liquid environments. Current techniques for measuring micro and nano-scale cell mechanical responses, e.g., AFM devices, are capable of measuring only one- or two-dimensional forces (e.g., normal and frictional forces or normal and torsional forces) and are unnecessarily complex for making simple force measurements. Accurate three dimensional (3-D) response or force sensors are not available.

In view of the disadvantages set forth above, a simple MEMS/NEMS-based force sensor for use in biological or cellular applications that can provide decoupled three dimensional force measurements is needed.

BRIEF DESCRIPTION OF THE FIGURES

The present invention can be more easily understood and the advantages and uses thereof more readily apparent when the following detailed description of the present invention is read in conjunction with the figures wherein.

DETAILED DESCRIPTION OF THE INVENTION

Before describing in detail exemplary methods and apparatuses related to a MEMS/NEMS sensor for measuring three dimensional forces, it should be observed that the present invention resides primarily in novel and non-obvious combinations of elements. So as not to obscure the disclosure with details that will be readily apparent to those skilled in the art, certain conventional elements have been presented with lesser detail, while the drawings and the specification describe in greater detail other elements more pertinent to understanding the invention.

The sensor of the present invention can measure mechanical properties (e.g., forces) of subject materials, e.g., in the study of cell mechanics. The present sensor is flexible and robust and can measure decoupled forces when the specimen or object under study is in an air or liquid environment. This is especially useful for in-situ studies of biological samples, such as cells, tissues, biomolecules, etc. The surface tension or meniscus forces of the liquid do not damage the sensor or inhibit accurate sensor operation. The force measuring sensor of the present invention provides easier, more accurate, and less expensive force measurements in a liquid environment than, for example, an AFM device.

The sensor of the present invention requires only a conventional optical microscope to measure the deflection or movement of a probe in contact with the specimen. Typically, measurement is accomplished by taking a photograph of the probe during force measurement and then using a conventional optical microscope to measure the deflection. Deflection of the probe of the present invention when measuring a force will be at least an order of magnitude larger than the deflection of an AFM probe subject to the same force.

The 3D measurement sensor is relatively simple, portable and robust, especially when compared with the complicated optical and electrical components required for other force measuring device such as an AFM device.

The sensor can also be oriented as needed in the working environment. To the contrary, AFM probes are fixed in a given orientation, making it difficult to adapt the AFM system to different types of samples in different orientations or to different working environments.

In addition to measuring three-dimensional cell forces accurately with the simple device of the present invention, the sensor can also be used in other applications (i.e., outside the biological arena) that require the measurement of micro-scale and nano-scale parameters, including forces.

Figure 1:
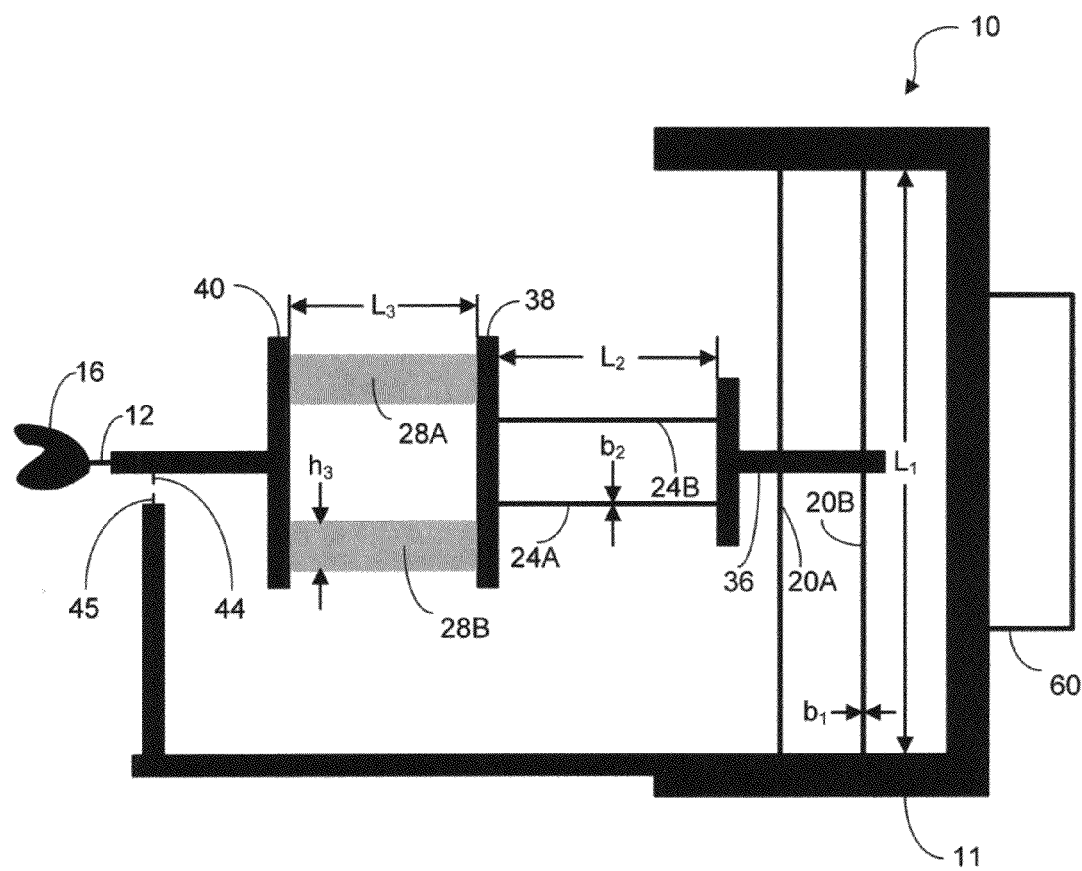
FIG. 1 is a block diagram illustrating a force sensor of the present invention.

FIG. 1 illustrates the 3-D force sensor 10 of the present invention. The sensor 10 comprises a sensor base 11, a probe 12, and three sets (pairs) of directionally-oriented microbeams (sensor beams) connected to the probe 12 for independently measuring respective x-, y- and z-directed force components, designated $F_x$, $F_y$, and $F_z$). The probe 12 is disposed in contact with a cell 16 or another specimen for which a force measurement is desired. Forces exerted by the cell 16 are transmitted to six sensor beams, causing at least two of the sensor beams to deflect responsive to a direction and a magnitude of the force.

Figure 2:
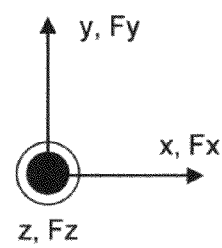
FIG. 2 is an x, y, and z axis coordinate system for use with the description of the present invention.

X-direction sensor beams 20A and 20B, extending vertically and have a width extending into the plane of the paper, measure deflections only in the x direction. That is, an x-direction force exerted by the cell 16 cause the sensor beams 20A and 20B to deflect in the x direction. See the x, y, and z axes coordinate system depicted in FIG. 2.

Y-direction sensor beams 24A and 24B extend horizontally and also have a width extending into the plane of the paper. The y-direction sensor beams 24A and 24B can deflect only in the y direction. Finally z-direction sensor beams 28A and 28B extend horizontally and have a width that is visible in FIG. 1; the sensor beams 28A and 28B deflect only in the z direction.

Two parallel micro-beams are used for each directional sensor to resist moment forces, including bending and twisting moments, that may be exerted on the sensor beams.

The x-direction sensor beams 20A and 20B deflect according to x-direction forces and the pair of beams 20A and 20B is referred to as an $F_x$ sensor beam. The y-direction sensor beams 24A and 24B measure y-direction forces according to the amount of deflection they experience and the pair of beams 24A and 24B is referred to as an $F_y$ sensor beam. The sensor beams 28A and 28B deflect according to z-direction forces and the pair of beams 28A and 28B is referred to as an $F_z$ sensor beam.

The x- y- and z-direction sensor beams have respective spring constants designated $k_x$, $k_y$ and $k_z$.

The six sensor beams 20A/20B, 24A/24B and 28A/28B preferably comprise the same material and thus have identical material properties, e.g. Young's moduli. However, this feature is not required according to the present invention if the different material properties of the sensor beams are considered when determining the measured forces.

A T-shaped backbone 36 connects the two $F_x$ sensor beams 20A and 20B, preferably at their midpoints. The backbone 36 is further connected to the $F_y$ sensor beams 24A and 24B as illustrated. A backbone 38 connects an assembly comprising the two $F_y$ sensor beams 24A and 24B and the two $F_x$ sensor beams 20A and 20B to a proximal end of the $F_z$ sensor beams 28A and 28B. Finally, a backbone 40 connects the two $F_z$ sensor beams 28A and 28B to the probe 12.

The illustrated configuration and shape of the backbones 36, 38, and 40 is not required. The backbones 36, 38 and 40 connect the x-, y- and z-direction sensor beams to the probe 12. The illustrated arrangement of the backbones and sensor beams provides for the transmission of cell forces to each of the $F_x$, $F_y$, and $F_z$ sensor beams. Since the $F_x$, $F_y$, and $F_z$ sensor beams are effectively decoupled, x-direction forces affect only the $F_x$ sensor beams; y-direction forces affect only the $F_y$ sensor beams; z-direction forces affect only the $F_z$ sensor beams. Pragmatically, x-direction forces do in fact affect the $F_y$ sensor beams and the $F_z$ sensor beams, but this effect is minimal and can be ignored when determining the x-direction forces. Similar reasoning applies to the y-direction and z-direction forces.

The $F_x$ sensor beams 20A and 20B have a depth $h_1$ into the plane of the paper and an illustrated width $b_1$. The $F_y$ sensor beams 24A and 24B have a depth $h_2$ into the plane of the paper and an illustrated width $b_2$. Preferably $b_1 = b_2$ and $h_1 = h_2$. Preferably $b_1 \ll h_1$ and $b_2 \ll h_2$. The sensor beams 20A/20B and 24A/24B have respective lengths $L_1$ and $L_2$ as illustrated in FIG. 1.

The width, depth, and length of the $F_z$ sensor beams 28A and 28B are $h_3$, $b_3$, and $L_3$, respectively, where $h_3 \gg b_3$. $b_3$ is the depth of the z-directed sensor beams 28A and 28B into the plane of the paper and $h_3$ is the dimension indicated in FIG. 1.

For purposes of the illustrated configuration, a major surface of the $F_x$ sensor beams 20A and 20B is bounded by edges having dimensions $L_1$ and $h_1$. A major surface of the $F_y$ sensor beams 24A and 24B is bounded by edges having dimensions $L_2$ and $h_2$. A major surface of the $F_z$ sensor beams 208 and 28B is bounded by edges having dimensions $L_3$ and $h_3$.

According to the preferred embodiment of the sensor 10, the combined stiffness of the $F_x$ sensor beams 20A and 20B in the x direction is much smaller than combined stiffness of the $F_y$ sensor beams in the y direction and the $F_z$ sensor beams in the z direction. Stated conversely the $F_y$ and the $F_z$ sensor beams are substantially more rigid to x-direction forces than the $F_x$ sensor beams. Thus the $F_x$ sensor beams are more responsive or sensitive to x-direction forces than the $F_y$ and the $F_z$ sensor beams are to the x-direction forces. This feature provides decoupling of the three pairs of sensor beams.

Similarly, the $F_y$ sensor beams 24A and 24B are substantially more sensitive or responsive to y-direction forces than are the $F_x$ sensor beams 20A and 20B and the $F_z$ sensor beams 28A and 28B. Finally, the $F_z$ sensor beams 28A and 28B are substantially more sensitive or responsive to the z-direction forces than are the $F_x$ sensor beams 20A and 20B and the $F_y$ sensor beams 24A and 24B.

With this relationship between the $F_x$, $F_y$, and $F_z$ sensor beams, these sensor beams are responsive substantially only to $F_x$, $F_y$, and $F_z$ forces, respectively. Thus the physical arrangement of the sensor beams illustrated in FIG. 2 and the stated stiffness and decoupled relationships between the $F_x$, $F_y$, and $F_z$ sensor beams achieves the decoupled measurement of the three dimensional force or response components.

Assuming a material comprising each of the sensor beams 20A, 20B, 24A, 24B 28A and 28B exhibits a Young's modulus of E, the spring constants of the $F_x$, $F_y$, and $F_z$ sensors are:

$$k_x = 384 E I_1 / L_1^3$$

$$k_y = 24 E I_2 / L_2^3$$

$$k_z = 6 E I_3 / L_3^3$$

In another embodiment the Young's modulus of each of the three sensor beams is different. Although this embodiment with different Young's modulus values may not be the preferred implementation, the embodiment can be accommodated by using appropriate values in the above equations.

The moments of inertia I of the cross-sections of the $F_x$, $F_y$, and $F_z$ sensor beams, are respectively.

$$I_1 = b_1 h_1^3 / 12$$

$$I_1 = I_2 = b_1 h_1^3 / 12$$

$$I_3 = h_3 b_3^3 / 12$$

Note that the effects of the micro-newton and nano-newton scale force $F_x$ (i.e., a tensile or a compressive force) on the $F_y$ and $F_z$ sensor beams through the spring constants $k_y$ and $k_z$ are negligible according to this analysis, which is based on known mechanics of materials principles and typical dimensions for the components of the sensor 10, as set forth in the next paragraph.

The deflections of the sensor beams are measured by displacement of a measurement point 44 (on the probe 12 and thus moving with the probe 12) relative to a fixed reference point 45, i.e., fixed relative to the x-, y- and z-directed sensor beams. According to one embodiment, a photograph is taken of the measurement point 44 and the reference point 45. The photograph is placed under an optical microscope to determine the displacement, for example by counting a number of pixels comprising the displacement interval. Knowing the size of each pixel, a product of the number of counted pixels and the pixel size is the displacement.

Assume the deflections or displacement of the measurement point 44 are $\delta_x$, $\delta_y$, and $\delta_z$ in the x, y, and z directions, respectively. The force response or measured force components are obtained from the equations:

$$F_x = k_x \delta_x$$

$$F_y = k_y \delta_y$$

$$F_z = k_z \delta_z$$

where the $k_x$, $k_y$, and $k_z$ values are the spring constants as calculated from the formulae above.

A piezoelectric actuator 60 attached to the sensor 10 is used to adjust the sensor prior to making force measurements.

The size of the probe 12 (and the shape of its tip, e.g., rounded tip, sharp tip, flat tip) can be designed according to the required contact configuration between the probe 12 and the specimen undergoing analysis.

The dimensions of the sensor beams 20A, 20B, 24A, 24B, 28A and 28B are determined according to the expected forces to be measured and the three-directional component forces to be resolved from that force.

Preferably, the sensor 10 is fabricated from a silicon-on-insulator (SOI) wafer through a process comprising two primary steps. The first primary step is to produce the thinner part of the sensor 10, i.e., the two $F_z$ sensor beams, by patterning the wafer through photolithography processes to define the top view of the two $F_z$ sensor beams, and anisotropically etching the exposed silicon using reactive ion etching (RIE) to reach a final thickness of $b_3$.

The second primary step fabricates the remaining components of the force sensor 10 by patterning the wafer again through photolithographic processes to define the top view of the remaining structures, anisotropically etching through the exposed silicon using RIE to expose the sandwiched oxide layer, and finally releasing the sensor through isotropically etching away the oxide layer underneath the sensor structures.

Based on the inventor's experience with one- and two-dimensional force sensors, a 3-D force sensor with a force resolution as low as 0.5 nN/µm may be easily fabricated and manipulated to meet current measurement needs. Improved force resolutions may be achieved by increasing the length and shrinking a cross section of the various sensor beams.

A typical range of the dimensions of the sensor is between about 0.5-3.0 µm for $h_1$ and $b_3$, between about 5.0-20.0 µm for $b_1$ and $h_3$, and between about 0.5-3.0 mm for $L_1$, $L_2$, and $L_3$. Similar dimensions can be used for $b_2$ and $h_3$.

The spring constants (which establish the force sensitivities of the fabricated sensor) can be calibrated by a pre-calibrated AFM device or by using pre-calibrated cantilevers. According to this calibration process, a pre-calibrated AFM cantilever exerts a force against the probe 12 and the deflections of the AFM cantilever and the deflections of the sensor beams are recorded. The spring constants of the sensor beams can then be readily obtained by multiplying the spring constant of the AFM cantilever by the ratio between the deflections of the AFM cantilever and the deflections of the sensor beams. A calibration process must be executed in each of the x, y and z dimensions.

Although the present invention is described for measuring forces in the micro-newton and nano-newton range, the teachings of the invention are not limited to forces of this scale. Force sensors for measuring smaller and larger forces can be constructed using the principles of the invention. Other parameters can also be measured using the sensor of the present invention.

Also although the present description ignores any deflections of the y and z sensor beams when a solely x-directed force is applied to the probe 12, in fact the y and z sensor beams undergo a slight but negligible deflection. These deflections are in the negligible range of about 0.5% to about 2.0% of the x-directed force and thus can be ignored in practice. Similar negligible deflections occur in the x and z sensor beams responsive to a solely y-directed force and in the x and y sensor beams responsive to a solely z-directed force.

While various embodiments of the present invention have been shown and described, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A force measuring device comprising:
   an x-axis sensor beam for measuring x-direction forces;
   a y-axis sensor beam for measuring y-direction forces;
   a z-axis sensor beam for measuring z-direction forces;
   wherein the x-axis, y-axis and z-axis sensor beams are decoupled such that forces exerted by a specimen in one direction do not exert substantial forces on the other two sensor beams; and
   wherein the x-direction force is a product of an x-direction deflection of the x-axis sensor beam and a spring constant of the x-axis sensor beam, and wherein the y-direction force is a product of a y-direction deflection of the y-axis sensor beam and a spring constant of the y-axis sensor beam, and wherein the z-direction force is a product of a z-direction deflection of the z-axis sensor beam and a spring constant of the z-axis sensor beam.

2. The force measuring device of claim 1 wherein the x-axis, y-axis and z-axis sensor beams are decoupled by a physical orientation of each one of the x-axis, y-axis and z-axis sensor beams.

3. The force measuring device of claim 1 wherein the x-axis sensor beam deflects a greater distance than the y-axis sensor beam and the z-axis sensor beam in response to an x-direction force, wherein the y-axis sensor beam deflects a greater distance than the x-axis sensor beam and the z-axis sensor beam in response to a y-direction force, and wherein the z-axis sensor beam deflects a greater distance than the x-axis sensor beam and the y-axis sensor beam in response to a z-direction force.

4. The force measuring device of claim 1 wherein a stiffness of the x-axis sensor beam to x-direction forces is smaller than a stiffness of the y-axis and z-axis sensor beams to x-direction forces, wherein a stiffness of the y-axis sensor beam to y-direction forces is smaller than a stiffness of the x-axis and z-axis sensor beams to y-direction forces, and wherein a stiffness of the z-axis sensor beam to z-direction forces is smaller than a stiffness of the x-axis and y-axis sensor beams to z-direction forces.

5. The force measuring device of claim 1 wherein the x-axis sensor beam is displaced a greater distance in the x direction than in the y and z directions responsive to an x-direction force, wherein the y-axis sensor beam is displaced a greater distance in the y direction than in the x and z directions responsive to a y-direction force, and wherein the z-axis sensor beam is displaced a greater distance in the z direction than in the x and y directions responsive to a z-direction force.

6. The force measuring device of claim 1 wherein each one of the x-axis, y-axis and z-axis sensor beams comprises first and second parallel sensor beams.

7. The force measuring device of claim 6 wherein the first and the second sensor beams of each of the x-axis, y-axis and z-axis sensor beams comprise a same material.

8. The force measuring device of claim 6 wherein the first and the second sensor beams of each of the x-axis, y-axis and z-axis sensor beams have substantially the same Young's modulus.

9. The force measuring device of claim 1 wherein the x-axis sensor beam comprises first and second parallel sensor beams oriented to deflect in the x direction responsive to an x-direction force, the y-axis sensor beam comprises third and fourth sensor beams oriented to deflect in the y direction responsive to a y-direction force, and the z-axis sensor beam comprises fifth and sixth sensor beams oriented to deflect in the z direction responsive to a z-direction force.

10. The force measuring device of claim 9 wherein a point on each one of the first and second sensor beams is coupled to a first end of each one of the third and fourth sensor beams and a second end of each one of the third and fourth sensor beams is coupled to a first end of the fifth and sixth sensor beams and wherein a probe is coupled to a second end of the fifth and sixth sensor beams.

11. The force measuring device of claim 9 wherein a major surface of the first and second parallel sensor beams is disposed in a yz plane such that an x-directed force causes the first and second sensor beams to deflect out of the yz plane, and wherein a major surface of the third and fourth sensor beams is disposed in a xz plane such that a y-directed force causes the third and fourth sensor beams to deflect out of the xz plane, and wherein a major surface of the fifth and sixth sensor beams is disposed in a xy plane such that a z-directed force causes the fifth and sixth sensor beams to deflect out of the xy plane.

12. The force measuring device of claim 1 further comprising a reference point and a probe coupled to the x-axis, y-axis and z-axis sensor beams and in contact with specimen, wherein x, y and z force components exerted on the probe by the specimen are determined by respective displacements of one or more of the x-axis, y-axis and z-axis sensor beams relative to the reference point.

13. The force measuring device of claim 12 wherein a shape of a tip of the probe is determined according to a desired contact configuration between the tip and the specimen.

14. The force measuring device of claim 12 wherein the x-direction, y-direction and z-direction displacements are determined by analysis of a photograph of the measurement point and the reference point.

15. The force measuring device of claim 14 wherein a number of photograph pixels in the x, y, and z directions indicates the respective x-direction, y-direction and z-direction displacements.

16. The force measuring device of claim 12 wherein the reference point is fixed relative to the x-axis sensor beam, the y-axis sensor beam and the z-axis sensor beam.

* * * * *